United States Patent [19]

Fujii

[11] Patent Number: 5,204,037
[45] Date of Patent: Apr. 20, 1993

[54] PROCESS FOR PRODUCTION OF POLYPROPYLENE SHEETS OR FILMS

[75] Inventor: Atsushi Fujii, Himeji, Japan

[73] Assignee: Idemitsu Petrochemical Co., Ltd., Tokyo, Japan

[21] Appl. No.: 816,349

[22] Filed: Dec. 30, 1991

[30] Foreign Application Priority Data

Jan. 25, 1991 [JP] Japan .................. 3-023779

[51] Int. Cl.$^5$ ............................................. B29C 47/90
[52] U.S. Cl. ............................ 264/171; 264/211.12; 264/216; 264/237; 264/280; 425/224; 425/327
[58] Field of Search ................ 264/237, 178 R, 179, 264/180, 216, 280, 171, 211.12; 425/71, 224; 427/327

[56] References Cited

U.S. PATENT DOCUMENTS

| | | | |
|---|---|---|---|
| 3,361,728 | 1/1968 | Coen et al. | 264/216 |
| 4,548,778 | 10/1985 | Fujii | 264/178 R |
| 4,863,653 | 9/1989 | Takubo et al. | 264/180 |
| 4,867,927 | 9/1989 | Funaki et al. | 264/180 |
| 5,026,778 | 6/1991 | Fujii et al. | 264/176.1 |
| 5,118,566 | 6/1992 | Wilhelm et al. | 428/339 |

FOREIGN PATENT DOCUMENTS

| | | | |
|---|---|---|---|
| 0406642 | 1/1991 | European Pat. Off. . | |
| 3319279 | 12/1984 | Fed. Rep. of Germany | 264/280 |
| 55-27203 | 2/1980 | Japan | 264/280 |
| 55-158924 | 12/1980 | Japan | 264/216 |
| 59-57720 | 4/1984 | Japan | 264/180 |
| 60-32572 | 7/1985 | Japan . | |
| 60-236719 | 11/1985 | Japan . | |
| 61-24977 | 6/1986 | Japan . | |
| 61-130018 | 6/1986 | Japan | 264/234 |
| 62-42822 | 2/1987 | Japan . | |
| 62-10816 | 3/1987 | Japan . | |
| 62-41457 | 9/1987 | Japan . | |
| 62-284719 | 12/1987 | Japan . | |

OTHER PUBLICATIONS

Patent Abstracts of Japan, vol. 7, No. 41 (M-194) (1186) Feb. 18, 1983 of JP-A-57 191 020, Nov. 24, 1982.
Derwent Publications Ltd., London, GB; AN 82-2064DE of JP-A-57 022 019, Feb. 4, 1982.

Primary Examiner—Jeffery Thurlow
Attorney, Agent, or Firm—Frishauf, Holtz, Goodman & Woodward

[57] ABSTRACT

A process for producing a polypropylene sheet or film. The process includes (a) providing two opposing cooling rolls which are maintained at a temperature of 10° to 50° C., (b) passing a metallic endless belt having a surface roughness of not more than 1.5 μm under tension, between the opposing cooling rolls, (c) producing a molten sheet or film of a polypropylene composition, the composition comprising polypropylene and at least one additive selected from the group consisting of a nucleating agent, a finely powdered high melting point polymer, a petroleum resin, a terpene resin, an organic peroxide and a crystalline propylene-based copolymer, (d) subjecting the produced sheet or film to a specular finishing treatment by passing the sheet or film between the metallic endless belt and one of the cooling rolls and conveying the sheet or film on the metallic endless belt over a surface portion of at least one of the cooling rolls and (e) separating the sheet or film from the metallic endless belt after the specular finishing treatment. The process results in a polypropylene sheet or film excellent in transparency and surface gloss, although not stretched. Moreover, the process provides high speed production of a polypropylene sheet of film.

26 Claims, 1 Drawing Sheet

PROCESS FOR PRODUCTION OF POLYPROPYLENE SHEETS OR FILMS

BACKGROUND OF THE INVENTION

The present invention relates to a process for efficiently producing polypropylene sheets or films which are of high transparency although not stretched and thus which are suitable for wrapping of foodstuffs, medicines and so forth.

Sheets or films made of crystalline thermoplastic resins, particularly polypropylene, are varied in physical properties such as transparency depending on the crystal form thereof. Heretofore, polypropylene has been limited in its use because when molded in the form of sheet or sheet-molded container, it is poor in transparency, although it is excellent in physical properties such as heat resistance, moisture resistance, light weight, oil resistance and non-polluting properties.

In order to make a polypropylene sheet transparent, it is necessary to impart gloss to both surfaces of the sheet and furthermore to make the inside of the sheet transparent. As techniques of imparting gloss to both surfaces of the sheet, a method of transferring the specular surface of roll, a method of transferring the specular surface by the use of a metallic, specular finished endless belt, and so forth are known. As techniques of making the sheet inside transparent, a method of preventing crystallization in the inside by using a specific material, a method of preventing crystallization by chilling, a method of breaking crystals by stretching or orientating, and so forth are known.

Therefore, various methods combining the above techniques have heretofore been proposed. For example, a method in which the specular surface is transferred and moreover a nucleating agent is added to the resin as the starting material, is proposed in order to make the sheet inside transparent while at the same time imparting gloss to both the surfaces of the resulting sheet. In accordance with this method, however, it is difficult to produce a thin sheet, and the transparency of the sheet is not satisfactorily high.

In addition, there is proposed a method in which the specular surface is transferred and moreover a rolling treatment is applied. This method, however, has a problem that thermal moldability is poor because stretching or orientation is conducted by rolling.

Moreover, a transferring method using a metallic, mirror finished endless belt is disclosed in Japanese Patent Publication Nos. 24977/1986 and 32572/1980, Japanese Patent Application Laid-Open No. 284719/1987, etc. In this method, however, transparency is not sufficiently high.

On the other hand, various techniques of controlling crystallization by rapid chilling have been proposed to improve transparency of crystalline thermoplastic resin sheets or films, as described in Japanese Patent Publication Nos. 41457/1987 and 10816/1987, Japanese Patent Application Laid-Open Nos. 42822/1987 and 236719/1985, etc., and they have been put into practical use.

In recent years, however, sheet products have been required to have increased quality and productivity. In accordance with the conventional method, when the thickness of the sheet is more than 0.6 mm, the limit of conduction of heat in the thickness direction causes a problem that the transparency is decreased abruptly. Thus, sheets which are highly transparent although of high thickness have been desired. Moreover, from a viewpoint of increase of productivity, it is required that the sheet can be produced at a high speed.

SUMMARY OF THE INVENTION

The object of the present invention is to provide a process for efficiently producing polypropylene sheets or films which are free from the aforementioned problems; particularly are of high surface gloss, and further excellent in surface smoothness and transparency.

The present invention relates to a process for producing a polypropylene sheet or film which comprises passing a molten sheet or film of a polypropylene composition, the composition comprising polypropylene and at least one additive selected from the group consisting of a nucleating agent, a finely powdered high melting point polymer, a petroleum resin, a terpene resin, an organic peroxide and a crystalline propylene-based copolymer, between two cooling rolls opposite to each other, the rolls being maintained at a temperature of 10° to 50° C., and being subjected to specular finishing treatment, and adapted so as to convey therebetween a metallic endless belt having a surface roughness of not more than 1.5 μm under tension, while carrying the sheet or film on the endless belt.

BRIEF DESCRIPTION OF THE DRAWINGS

FIG. 2 is a schematic view illustrating another embodiment of the apparatus, wherein.

Figure 1:
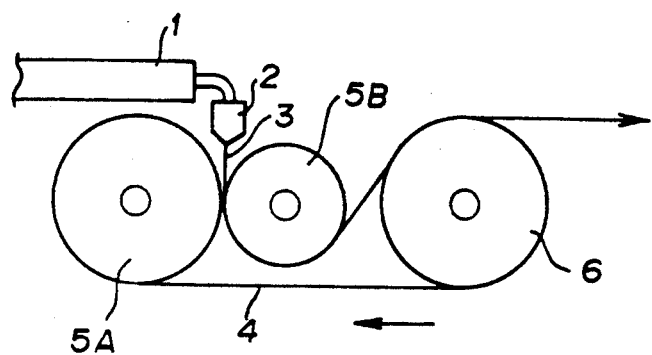
FIG. 1 is a schematic view illustrating an embodiment of an apparatus for use in practice of the process of the present invention.

1: Extrusion unit
2: T-die
3: Sheet or film
4: Metallic endless belt
5A, 5B: Cooling rolls
6: Auxiliary roll
7: Unwinding reel stand (Unwinding reel stand of sheets or films for preparation of laminate)
8: Sheet or film.

DETAILED DESCRIPTION OF THE INVENTION

As the polypropylene for use as the main starting material in production of sheets or films in accordance with the process of the present invention, a propylene homopolymer is preferably used. The term "sheet or film" as used herein includes a multilayer sheet or film.

In the present invention, to the polypropylene as described above, at least one additive selected from the group consisting of a nucleating agent, a fine powder of high melting point polymer, a petroleum resin, a terpene resin, an organic peroxide and a crystalline propylene-based copolymer is added, and the resulting polypropylene composition is extruded in the form of sheet or film from a T-die, for example.

The nucleating agent that can be used, includes talc, organic carboxylic acid salts and metal salts thereof, organic phosphoric acid metal salts, polyvinyl cycloalkane, and dibenzylidene sorbitol derivatives represented by the general formula (I):

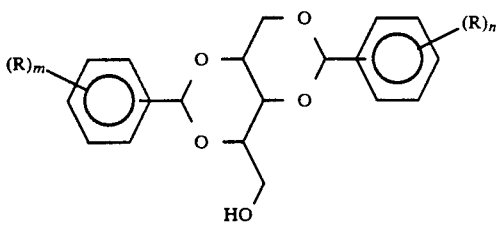

wherein R is an alkyl group having 1 to 8 carbon atoms, a halogen atom or an alkoxy group having 1 to 4 carbon atoms, Rs may be the same or different, and m and n are each an integer of 0 to 3. These compounds can be used alone or as mixtures comprising two or more thereof.

The amount of the nucleating agent used in the process of the present invention is 0.5 to 10,000 ppm, preferably 100 to 4,000 ppm, by weight, of the polypropylene. If the amount of the nucleating agent used is less than 0.5 ppm, transparency is not sufficiently high. On the other hand, if it is more than 10,000 ppm, bleeding of the nucleating agent to the surface undesirably occurs.

The high melting point polymer includes polymers having a melting point as high as more than 200° C., such as polycarbonate and polyamide. In the process of the present invention, the high melting point polymer is used in the form of fine powder (less than 1 μm in particle diameter).

The amount of the fine powder of high melting point polymer used in the process of the present invention is 0.5 to 10,000 ppm, preferably 100 to 4,000 ppm, by weight, of the polypropylene. If the amount of the high melting point polymer fine powder used is less than 0.5 ppm, transparency is not sufficiently high. On the other hand, if it is more than 10,000 ppm, the resulting composition becomes turbid, resulting in a decrease in transparency.

As the petroleum resin, for example, an aliphatic petroleum resin having a molecular weight of 500 to 5,000 and a softening point of 50° to 170° C. is used. In addition, a terpene resin can be used in place of the petroleum resin.

The amount of the petroleum resin or terpene resin used is 3 to 30 wt %, preferably 5 to 15 wt % of the polypropylene. If the amount of the petroleum resin or terpene resin used is less than 3 wt %, the effect of improving transparency is poor. On the other hand, if it is more than 30 wt %, the resulting sheet undesirably becomes brittle.

In the process of the present invention, as the additive, an organic peroxide can be used as well. When the organic peroxide is used, the polypropylene is decomposed by heating in the presence of the organic peroxide and the resulting heat decomposed polypropylene is used as the starting material.

The organic peroxide as used herein is not always critical, but it is necessary to be easy in handling on a commercial scale and to be effective. More specifically, organic peroxides having a half-life period of more than 0.5 minute at 150° C. are preferably used. Examples of the organic peroxide are 2,5-dimethyl-2,5-di(tert-butylperoxy)hexane, 1,1-bis(tert-butylperoxy)3,3,5-trimethylcyclohexane, tert-butylperoxy isopropylcarbonate, tert-butyl per-3,3,5-trimethylhexanoate, and 1,3-bis(2-tert-butylperoxyisopropyl)benzene.

The amount of the organic peroxide used is determined appropriately depending on the starting material, the desired melt index (MI) of the composition, the decomposition temperature of the organic peroxide, the time and so forth. Heat decomposition of the polypropylene using the organic peroxide as described above can be carried out according to known methods. More specifically, the polypropylene is mixed with the organic peroxide, and the resulting mixture is processed at elevated temperatures by the use of a Bumbury's mixer, rolls, an extruder or the like. Of these, a continuous extruder is preferably employed from an economic standpoint.

In addition, as the additive, a crystalline propylene-based copolymer can be used. The crystalline propylene-based copolymer may be any of a propylene random copolymer, a propylene block copolymer, and a propylene graft copolymer. Of these, the propylene random copolymer and the propylene block copolymer are preferred fron an economic standpoint.

As the propylene random copolymer, an α-olefin-propylene random copolymer is preferred, with an ethylene-propylene random copolymer having a MI of not more than 10 g/10-min and an ethylene content of 1 to 20 wt % being particularly preferred.

If the ethylene content of the ethylene-propylene copolymer is less than 1 wt %, the effect of improving the transparency of the resulting molding is not obtained. On the other hand, if it is more than 20 wt %, the resulting copolymer is decreased in crystallinity, undesirably leading to a decrease in the effect of improving the transparency of the molding.

As the propylene block copolymer, an α-olefin-propylene block copolymer is preferred, with an ethylene-propylene block copolymer having a MI of not more than 10 g/10-min and an ethylene content of 1 to 40 wt % being particularly preferred.

If the ethylene content of the ethylene-propylene block copolymer is less than 1 wt %, the effect of improving the transparency of the molding is not obtained. On the other hand, if it is more than 40 wt %, the whiteness of the resulting molding undesirably becomes prominent.

Although it is sufficient to use any one of the aforementioned crystalline propylene-based copolymers, a mixture comprising two or more thereof can be used as well. In particular, the use of the propylene random copolymer and the propylene block copolymer in combination permits to mroe increase the surface gloss and transparency of the molding. It is particularly preferred to use a combination of an ethylene-propylene random copolymer having MI of not more than 10 g/10-min and an ethylene content of 1 to 20 wt %, and an ethylene-propylene block copolymer having MI of not more than 10 g/10-min and an ethylene content of 1 to 40 wt %.

The crystalline propylene-based copolymer is used in a proportion of 0.2 to 40 parts by weight, preferably 1.0 to 30 parts by weight per 100 parts by weight of the polypropylene.

If the amount of the crystalline propylene-based copolymer added is less than 0.2 part by weight, the effect of decreasing the spherulite size of the resulting sheet is reduced, as a result of which no effect of increasing the transparency of the molding can be obtained. On the other hand, if the amount of the crystalline propylene-based copolymer added is more than 40 parts by weight, the whiteness of the molding is gradually increased, or unevenness is produced by incomplete kneading, which is undesirable. It is particularly preferred that the amount of the crystalline propylene copolymer used be in the range of 1.0 to 30 parts by weight, because the effect of increasing the transparency of the molding is exhibited outstandingly.

A mixture of at least one of the aforementioned additives, and the polypropylene is used as a feed material, and molded in the form of film. This resinous film can be produced by known techniques, usually by the T-die method or the calender roll method. From a standpoint of ease of operation, the T-die method is preferably employed. More specifically, the above feed resin is melt kneaded at a temperature of 200° to 280° C. in a T-die extruder and extruded in the form of film from the T-die to obtain a sheet or film.

Although in accordance with the process of the present invention, there can be obtained a sheet or film having relatively good transparency even if its thickness is more than 0.6 mm, the thickness of the sheet or film is preferably not more than 1 mm and particularly preferably not more than 0.6 mm. If the thickness of the sheet or film is more than 1 mm, the internal haze is increased, leading to a decrease of transparency.

The sheet or film thus obtained is, owing to the properties of the feed resin, relatively small in scattering of light in the inside thereof, that is, relatively small in the internal haze, and thus is good in transparency. In accordance with the present invention, to improve the gloss of both surfaces of the sheet or film along with the transparency, the following processing is applied.

The sheet or film is introduced between two cooling rolls opposite to each other, the rolls being maintained at a temperature of 10° to 50° C. and provided with a metallic endless belt with a surface roughness of not more than 1.5 μm under tension, while carrying on the endless belt. In this processing, transferring the surface of the endless belt is conducted concurrently with rapid cooling, whereby the internal haze is decreased and the sheet surface is provided with gloss.

The process of the present invention will hereinafter be explained with reference to the accompanying drawings.

FIG. 1 is a schematic view illustrating an embodiment of an apparatus for use in practice of the process of the present invention.

Referring to FIG. 1, the feed resin as described above is placed in an extruder 1 and melt extruded in the form of sheet or film from a T-die 2 to obtain a sheet or film 3 (molten resinous film). Although the T-die 2 is directed downwards in FIG. 1, it may be placed in a lateral direction. When, however, the T-die 2 is directed downwards, there can be obtained an advantage that it is applicable to a molten resinous film having a low viscosity.

The sheet or film 3 is then quickly introduced between cooling rolls 5A and 5B located opposite to each other, the rolls being provided with a metallic endless belt 4 under tension, while carrying on the endless belt.

The metallic endless belt 4 is backed up by the cooling roll 5A, the cooling roll 5B, and further by an auxiliary roll 6. In addition, one or more auxiliary rolls may be used. The metallic endless belt 4 is provided under tension among the cooling roll 5A, the cooling roll 5B and the auxiliary roll 6.

Thus the sheet or film 3 is introduced into the nip between the cooling roll 5A and the cooling roll 5B, and further the auxiliary roll 6 in the manner that it is conveyed on the metallic endless belt 4. First, the sheet or film 3 is nipped by the metallic endless belt 4 and the cooling roll 5B, and then conveyed in a contact condition under pressue with the metallic endless belt 4 and the cooling roll 5B. As a result, polishing of both the surfaces and cooling are attained effectively.

The metallic endless belt 4 is subjected to specular (mirror) finishing treatment such that the surface roughness is not more than 1.5 μm and preferably not more than 0.1 μm. The metallic endless belt 4 is usually made of SUS, carbon steel, titanium alloy or the like, and is preferably made of SUS. The thickness of the metallic endless belt 4 is usually about 0.8 mm. The metallic endless belt 4 is usually moved at a relatively high speed of 10 to 36 m/min.

The force to nip the sheet or film 3 with the cooling roll 5A and the metallic endless belt 4 backed up by the cooling roll 5B, that is, the nipping force of the molten resinous film is controlled in the range of 5 to 30 kg/cm. If the nipping force is less than 5 kg/cm, the touch becomes uneven. On the other hand, if it is more than 30 kg/cm, bank marks are formed on the sheet or film 3, or orientation of the sheet or film 3 is caused.

The distance that the metallic endless belt 4 and the cooling roll 5B are in contact with each other under pressure after the nipping, cannot be determined unconditionally, because it varies depending on the pulling speed of the sheet or film 3, the thickness of the sheet of film 3, and the belt/roll temperature. Generally speaking, the distance is preferred to be as long as possible, and the temperature of the sheet or film 3 at the point that it leaves the cooling roll 5B, is necessary to be decreased to that at which no spherulite is formed.

Cooling of the sheet or film 3 is basically carried out by the cooling roll 5B and the metallic endless belt 4. Since the temperature of the metallic endless belt 4 is greatly influenced by the cooling roll 5A and becomes substantially the same as that of the cooling roll 5A, the temperature of the sheet or film 3 is finally controlled by the cooling roll 5A and the cooling roll 5B located opposite to each other.

In the process of the present invention, the temperatures of the cooling rolls 5A and 5B are controlled within the range of 10° to 50° C. As the temperatures of the metallic endless belt 4 and the cooling roll 5B are lower, the transparency (internal haze) is more improved. However, if the temperature is less than 10° C., dew is produced, or banks are formed by rapid cooling, causing the formation of bank marks on the sheet or film 3. On the contrary, if the temperature is high, the sheet or film 3 is hardly cooled or solidified, leading to a decrease in the transparency thereof.

Thus, in the process of the present invention, the temperature of each of the cooling roll 5A and the cooling roll 5B is controlled within the range of 10° to 50° C., preferably from the dew point to 40° C.

The sheet or film 3 thus cooled is then wound on a winding roll (not shown) as the film product. At a stage before this winding, annealing using a heating roll, for example, is preferably carried out from a viewpoint of preventing curling. In this case, the heating temperature is in the range of 80° to 130° C., preferably 110° to 130° C.

Figure 2:
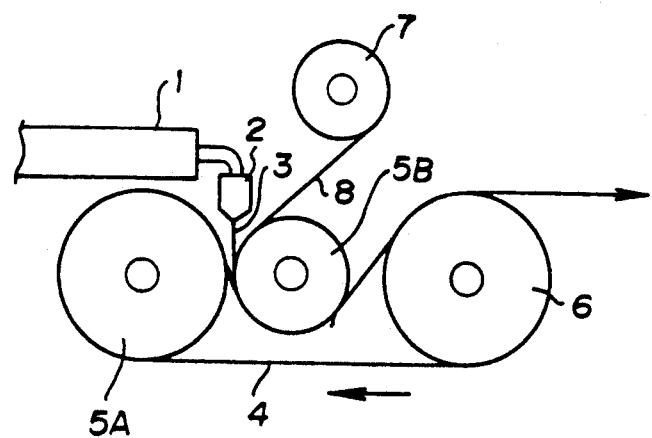

Although a single-layer sheet or film is explained hereinabove, a laminate sheet of high thickness can also be produced by the process of the present invention, using an apparatus shown in FIG. 2.

A sheet or film 8 is fed from an unwinding reel stand (unwinding reel stand of sheets or films for preparation of laminate) 7 on which the sheet or film 8 has been wound, and then superposed on the sheet or film 3 as described above. Hereinafter, the resulting laminate is processed in the same manner as described referring to the apparatus of FIG. 1 to thereby obtain the desired polypropylene laminate having excellent transparency.

In accordance with the process of the present invention, there can be obtained a polypropylene sheet or film excellent in transparency and surface gloss although not stretched.

The sheet or film obtained is good in transparency and surface gloss even though it is thick-walled.

Moreover the process of the present invention permits to produce the sheet or film as described above at a high speed, and it has an advantage of being excellent in productivity because the process can be carried out at relatively high temperatures compared with water cooling, for example.

The sheet or film produced by the process of the present invention less shows gels and fish eyes on the surface thereof, and furthermore it is excellent in heat moldability.

Accordingly, the sheet or film produced by the process of the present invention is suitable for use in wrapping of foodstuffs, medicines, stationery, and the like. It can also be used as a feed material for heat molding such as pressure molding.

The present invention is described in greater detail with reference to the following examples.

EXAMPLES 1 to 4

In these examples, the apparatus shown in FIG. 1 was used. To 100 parts by weight of a propylene homopolymer (PP-1) (density: 0.91 g/cm$^3$, MI: 2.0 g/10 min, Idemitsu Polypro F-200S (trade name)) as the polypropylene was added a predetermined amount of each of the additives shown in Table 1, and the resulting mixture was extruded at a resin temperature of 280° C. from a T-die 2 of a T-die extruder 1 (extruder diameter: 90 mm, L/D=32, die width: 500 mm, die lip clearance: 1 mm). The sheet or film 3 (molten resinous film) thus extruded was continuously introduced into between cooling rolls 5A, 5B opposite to each other and provided with a metallic endless belt 4 (endless belt made of SUS, surface roughness: 0.1 μm, belt thickness: 0.8 mm) under tension, while carrying on the endless belt 4. In this manner, a polypropylene sheet having a thickness of 0.3 mm was obtained. Molding conditions and the results are shown in Table 1. The nip pressure was 20 kg/cm$^2$. In Table 1, the cooling temperature indicates the temperature of the metallic endless belt 4, the cooling roll 5A and the cooling roll 5B.

The type of the additive and the amount of the additive used as shown in Table 1 are as follows:

Nucleating agent: DBS (1,3-2,4 dibenzylidene sorbitol) (trade name: Gelol MD, produced by Shin-Nippon Rikagaku Co., Ltd.), 3,000 ppm Petroleum resin: Alkon P-125 (produced by Arakawa Kagaku Co., Ltd.), 15 wt %

Terpene resin: Clearon P-125 (Yasuhara Yushi Co., Ltd.) 15 wt %

PP-2: Propylene random copolymer (density: 0.90 g/cm$^3$, MI: 7.0 g/10-min, Idemitsu Polypro F-730N (trade name)).

This PP-2 was used in an amount such that the ratio of PP-1/PP-2 was 85/15 (by weight).

EXAMPLE 5

The procedure of Example 1 was repeated with the exception that in place of PP-1 as the starting material, there was used polypropylene which had been obtained by mixing PP-1 and 0.04 wt % of 2,5-dimethyl-2,5-di(-tert-butylperoxy)hexane (trade name: Perhexa 25B, produced by Nippon Yushi Co., Ltd.) in a Henschel mixer at 250 rpm at room temperature and then decomposing by heating. In this way, a polypropylene sheet having a thickness of 0.3 mm was obtained. Molding conditions and the results are shown in Table 1.

EXAMPLE 6

The procedure of Example 1 was repeated with the exception that the film-forming speed was changed to 16 m/min. In this way, a polypropylene sheet having a thickness of 0.6 mm was obtained. Molding conditions and the results are shown in Table 1.

COMPARATIVE EXAMPLE 1

In the same manner as in Example 1 except that no nucleating agent was added, a 0.3 mm thick polypropylene sheet was produced. Molding conditions and the results are shown in Table 1.

COMPARATIVE EXAMPLE 2

In the same manner as in Example 1 except that the cooling temperature was set at 8° C., a 0.3 mm thick polypropylene sheet was produced. Molding conditions and the results are shown in Table 1.

COMPARATIVE EXAMPLE 3

In the same manner as in Example 1 except that the cooling temperature was set at 55° C., a 0.3 mm thick polypropylene sheet was produced. Molding conditions and the results are shown in Table 1.

COMPARATIVE EXAMPLE 4

In the same manner as in Example 1 except that the processing was conducted using a touch roll maintained at 20° C. in place of the apparatus shown in FIG. 1, a 0.3 mm thick polypropylene sheet was produced. Molding conditions and the results are shown in Table 1.

COMPARATIVE EXAMPLE 5

In the same manner as in Example 1 except that the processing was conducted using a touch roll maintained at 60° C. in place of the apparatus shown in FIG. 1, and the film-forming speed was changed to 16 m/min, a 0.6 mm thick polypropylene sheet was produced. Molding conditions and the results are shown in Table 1.

TABLE 1

| Run No. | Additive | Film-Forming Method | Cooling Temp. (°C.) | Film-Forming Speed (m/min) | Sheet Thickness (mm) | Appearance | Total Haze | Gloss |
| --- | --- | --- | --- | --- | --- | --- | --- | --- |
| Ex. 1 | Nucleating agent | FIG. 1 | 20 | 31 | 0.3 | Good | 0.9 | 124 |
| Ex. 2 | Petroleum resin | FIG. 1 | 20 | 31 | 0.3 | Good | 1.4 | 115 |
| Ex. 3 | Nucleating agent + Petroleum resin | FIG. 1 | 20 | 31 | 0.3 | Good | 0.8 | 126 |
| Ex. 4 | PP-2 | FIG. 1 | 20 | 31 | 0.3 | Good | 9.3 | 125 |

TABLE 1-continued

| Run No. | Additive | Film-Forming Method | Cooling Temp. (°C.) | Film-Forming Speed (m/min) | Sheet Thickness (mm) | Appearance | Total Haze | Gloss |
|---|---|---|---|---|---|---|---|---|
| Ex. 5 | Peroxide | FIG. 1 | 20 | 31 | 0.3 | Good | 6.3 | 124 |
| Ex. 6 | Nucleating agent | FIG. 1 | 20 | 16 | 0.6 | Good | 9.1 | 125 |
| Com. Ex. 1 | — | FIG. 1 | 20 | 31 | 0.3 | Good | 23.5 | 120 |
| Com. Ex. 2 | Nucleating agent | FIG. 1 | 8 | 31 | 0.3 | Bank marks | 2.3 | — |
| Com. Ex. 3 | Nucleating agent | FIG. 1 | 55 | 31 | 0.3 | Good | 11.2 | 120 |
| Com. Ex. 4 | Nucleating agent | Touch roll | 20 | 31 | No uniform molding (Impossible to conduct uniform touch) | | | |
| Com. Ex. 5 | Nucleating agent | Touch roll | 60 | 16 | 0.6 | Good | 38.2 | 121 |

Total haze and gloss: According to JIS K-7105.

What is claimed is:

1. A process for producing a polypropylene sheet or film which comprises:
(a) providing two opposing cooling rolls which are maintained at a temperature of 10° to 50° C.;
(b) passing a metallic endless belt having a surface roughness of not more than 1.5 μm under tension, between said opposing cooling rolls;
(c) producing a molten sheet or film of a polypropylene composition, the composition comprising polypropylene and at least one additive selected from the group consisting of
  (i) a nucleating agent being at least one member selected from the group consisting of talc, organic carboxylic acid salts; organic phosphoric acid metal salts; polyvinyl cycloalkane and at least one dibenzylidene sorbitol compound of the formula

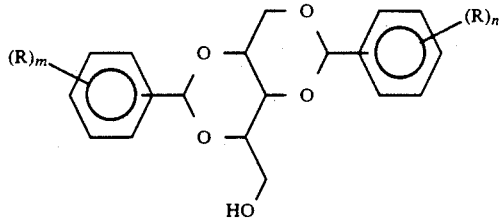

wherein R is an alkyl group having 1 to 8 carbon atoms, a halogen atom or an alkoxy group having 1 to 4 carbon atoms, and m and n are each 0 to 3,
  (ii) a finely powdered high melting point polymer having a melting point of more than 200° C.,
  (iii) a petroleum resin,
  (iv) a terpene resin,
  (v) an organic peroxide, and
  (vi) a crystalline propylene-based copolymer, and
(d) subjecting the produced sheet or film to a specular finishing treatment by passing the sheet or film between said metallic endless belt and one of said cooling rolls and conveying the sheet or film on said metallic endless belt over a surface portion of at least one of said cooling rolls; and
(e) separating said sheet or film from said metallic endless belt after said specular finishing treatment.

2. The process as claimed in claim 1, wherein the polypropylene is a propylene homopolymer.

3. The process as claimed in claim 1, wherein the additive is the nucleating agent in an amount of 0.5 to 10,000 ppm, by weight, of the polypropylene.

4. The process as claimed in claim 1, wherein the additive is the fine powdered high melting point polymer in an amount of 0.5 to 10,000 ppm, by weight, of the polypropylene.

5. The process as claimed in claim 1, wherein the additive is the petroleum resin or the terpene resin in an amount of 3 to 30 wt % of the polypropylene.

6. The process as claimed in claim 1, wherein the additive is the crystalline propylene-based copolymer in an amount of 0.2 to 40 parts by weight per 100 parts by weight of the polypropoylene.

7. The process as claimed in claim 1, wherein the temperature of two cooling rolls is from the dew point to 40° C.

8. The process as claimed in claim 1, wherein the additive is the nucleating agent, said nucleating agent being an organic carboxylic acid metal salt.

9. The process as claimed in claim 1, wherein the additive is the nucleating agent in an amount of 100 to 4,000 ppm, by weight, of the polypropylene.

10. The process as claimed in claim 4, wherein the fine powdered high melting point polymer is selected from the group consisting of polycarbonate and polyamide, has a particle diameter of less than 1 μm and is in an amount of 100 to 4,000 ppm, by weight, of the polypropylene.

11. The process as claimed in claim 1, wherein the additive is the terpene resin, said terpene resin having a molecular weight of 500 to 5,000 and a softening point of 50° to 170° C.

12. The process as claimed in claim 1, wherein the additive is the organic peroxide which is selected from the group consisting of 2,5-dimethyl-2,5-di(tert-butylperoxy)hexane, 1,1-bis(tert-butylperoxy)3,3,5-trimethylcyclohexane, tert-butylperoxyisopropylcarbonate, tert-butyl per-3,3,5-trimethylhexanoate and 1,3-bis(2-tert-butylperoxyisopropyl)benzene.

13. The process as claimed in claim 6, wherein the crystalline propylene-based copolymer is a propylene random copolymer or a propylene block copolymer.

14. The process as claimed in claim 13, wherein the crystalline propylene-based copolymer is an ethylene-propylene random copolymer having a MI of not more than 10 g/10-minutes and an ethylene content of 1 to 20 weight % or an ethylene-propylene block copolymer having an MI of not more than 10 g/10-minute and an ethylene content of 1 to 40 weight %, or a combination thereof.

15. The process as claimed in claim 1, wherein the sheet or film produced by the process has a thickness not more than 0.6 mm.

16. The process as claimed in claim 15, wherein the surface roughness is not more than 0.1 μm.

17. The process as claimed in claim 16, wherein the endless belt moves at a speed of 10 to 36 m/min.

18. The process as claimed in claim 17, wherein a nipping force applied by the cooling rolls and the endless belt to the sheet or film is 5 to 30 kg/cm.

19. The process as claimed in claim 18, wherein the temperature of the cooling rolls is the dew point temperature to 40° C.

20. The method of claim 1, further comprising an additional roll spaced apart from said cooling rolls and around which said metallic endless belt is passed.

21. The method of claim 20, wherein said metallic endless belt passes over surface portions of said two opposing cooling rolls and then over a surface portion of said additional roll, and then back to said cooling rolls.

22. The method of claim 21, wherein said separating step takes place at said additional roll.

23. The method of claim 1, further comprising
feeding a sheet laminate material between said molten sheet or film and said one of said cooling rolls as said molten sheet or film is fed between said metallic endless belt and said one of said cooling rolls; and
conveying said sheet or film and said laminate material between said metallic endless belt and said one of said cooling rolls, said sheet or film with laminate adhered thereto being separated from said metallic endless belt after said specular finishing treatment.

24. The method of claim 23, further comprising an additional roll spaced apart from said cooling rolls and around which said metallic endless belt is passed.

25. The method of claim 24, wherein said metallic endless belt passes over surface portions of said two opposing cooling rolls and then over a surface portion of said additional roll, and then back to said cooling rolls.

26. The method of claim 25, wherein said separating step takes place at said additional roll.

* * * * *